United States Patent
Rozkowski

(10) Patent No.: US 7,770,258 B2
(45) Date of Patent: Aug. 10, 2010

(54) SEAT ASSEMBLY PIVOT BUSHING

(75) Inventor: Lilly E. Rozkowski, Sterling Heights, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 655 days.

(21) Appl. No.: 11/662,353

(22) PCT Filed: Sep. 26, 2005

(86) PCT No.: PCT/CA2005/001448

§ 371 (c)(1),
(2), (4) Date: Mar. 8, 2007

(87) PCT Pub. No.: WO2006/050595

PCT Pub. Date: May 18, 2006

(65) Prior Publication Data

US 2008/0067854 A1  Mar. 20, 2008

Related U.S. Application Data

(60) Provisional application No. 60/612,817, filed on Sep. 24, 2004.

(51) Int. Cl.
*F16L 5/00* (2006.01)

(52) U.S. Cl. .......................... 16/2.1; 16/273

(58) Field of Classification Search .................. 16/201, 16/2.2, 2.5, 273, 276, 108, 109; 384/296, 384/275, 276; 74/535–538, 529, 562; 174/65 R, 174/83, 85, 76, 76 R, 91, 92; 248/56, 634, 248/635

See application file for complete search history.

(56) References Cited

U.S. PATENT DOCUMENTS

| | | | | | |
|---|---|---|---|---|---|
| 3,952,840 | A | * | 4/1976 | Yamazaki et al. | 188/71.8 |
| 5,092,017 | A | * | 3/1992 | Hatano et al. | 16/277 |
| 5,145,265 | A | * | 9/1992 | Flem | 384/296 |
| 5,328,160 | A | * | 7/1994 | McLaughlin | 267/141.3 |
| 5,518,318 | A | * | 5/1996 | Orndorff, Jr. | 384/98 |
| 5,716,144 | A | * | 2/1998 | Bickle et al. | 384/275 |
| 5,829,317 | A | * | 11/1998 | Vreeken et al. | 74/560 |
| 6,142,525 | A | | 11/2000 | Boelstler et al. | |
| 6,755,571 | B2 | * | 6/2004 | Kajiyama | 384/276 |
| 6,942,387 | B2 | * | 9/2005 | Janz | 384/129 |
| 7,047,596 | B2 | * | 5/2006 | Sucic et al. | 16/2.1 |

OTHER PUBLICATIONS

International Search Report & Written Opinion for PCT/CA2005/001448 Dated Feb. 1, 2006.

* cited by examiner

*Primary Examiner*—Chuck Y. Mah
(74) *Attorney, Agent, or Firm*—Clark Hill PLC

(57) ABSTRACT

A pivot bushing for insulating a pivot shaft and component pivotally mounted to a seat assembly of an automotive vehicle. The pivot bushing comprises a circumferential planar rim having an inner surface defining a bushing aperture and an outer surface defining a bearing surface. The inner and outer surfaces extend between an upper edge and a lower end. An upper flange projects outwardly from the upper edge of the rim and about the perimeter of the outer surface and a lower flange projects outwardly from the lower edge of the rim and about the perimeter of the outer surface defining a channel formed between the outer surface, upper flange and lower flange for receiving and insulating the component from the pivot shaft.

2 Claims, 2 Drawing Sheets

US 7,770,258 B2

SEAT ASSEMBLY PIVOT BUSHING

BACKGROUND OF THE INVENTION

1. Field of Invention

The invention relates to a seat assembly for an automotive vehicle. More particularly, the invention relates to a pivot bushing for insulating and reducing friction around a pivot shaft of a seat assembly.

2. Description of the Related Art

Automotive vehicles include seat assemblies for supporting occupants within the vehicle. Each seat assembly typically includes a generally horizontal seat cushion coupled to a generally vertical seat back. The seat assembly often includes several pivot shafts for pivotally or rotatably mounting a component to a portion of the seat assembly. For example, a belt anchor of the seat belt assembly is commonly mounted to the frame of the seat assembly by a pivot shaft to allow the belt anchor to pivot relative to the seat assembly and enable the seat occupant to align and connect the seat belt and buckle. The pivot shaft is inserted through an aperture in the belt anchor and threaded or bolted to the frame of the seat assembly. However, the space between the pivot shaft and the aperture in the belt anchor allows the belt anchor to move relative to the pivot shaft and cause excessive vibrational noise, often referred to as buzz, squeek, and rattle ("BSR"). Additionally, the movement between the pivot shaft and belt anchor also caused excessive friction and wear between the same parts. Similar deficiencies exist between other pivot shafts used for pivotally or rotatably mounting a component to the seat assembly.

Therefore, it remains desirable to provide a pivot bushing mounted between the pivot shaft and the component mounted to the seat assembly to insulate, reduce vibration, and reduce friction therebetween.

SUMMARY OF THE INVENTION

According to one aspect of the invention, there is provided a pivot bushing for insulating a pivot shaft and component pivotally mounted to a seat assembly of an automotive vehicle. The pivot bushing comprises a circumferential planar rim having an inner surface defining a bushing aperture and an outer surface defining a bearing surface. The inner and outer surfaces extend between an upper edge and a lower end. An upper flange projects outwardly from the upper edge of the rim and about the perimeter of the outer surface and a lower flange projects outwardly from the lower edge of the rim and about the perimeter of the outer surface defining a channel formed between the outer surface, upper flange and lower flange for receiving and insulating the component from the pivot shaft.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
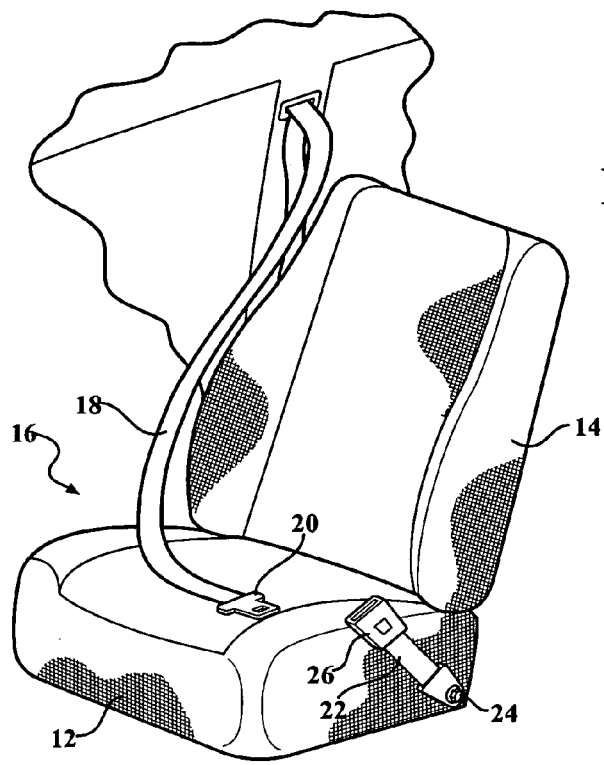
FIG. 1 is a front perspective view of a seat assembly incorporating pivot bushing pivotally coupling a belt anchor to the seat assembly according to one embodiment of the FIG. 2 is a plan view of the pivot bushing coupled between a pivot shaft and component of the seat assembly.

Referring to FIG. 1, there is illustrated a seat assembly 10 for an automotive vehicle. The seat assembly 10 includes a seat cushion 12 for supporting a seat occupant above the floor of the vehicle. The seat assembly 10 also includes a seat back 14 coupled to the seat cushion 12. The embodiment of FIG. 1 discloses an integrated seat belt restraint assembly 16 including a shoulder belt 18 extending from the B-pillar of the vehicle terminating at a male portion 20 of a buckle and a lap belt 22 extending from a belt anchor 24 secured to the seat cushion 12 to a female portion 26 of the buckle. The male portion 20 is lockably received in the female portion 26 of the buckle to retain the occupant within the seat assembly 10.

Figure 2:
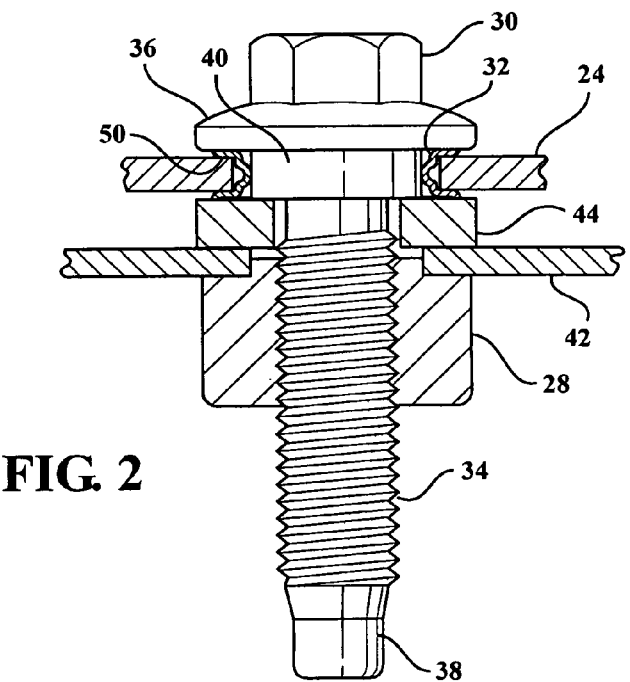

Referring to FIG. 2, the belt anchor 24 is shown in more detail attached to a mounting structure 28 of the seat cushion 12 by a shoulder bolt, or pivot shaft, 30. Specifically, the belt anchor 24 includes an aperture 32 therethrough defined by a circumferential edge 33 for receiving the elongated shoulder bolt 30. The shoulder bolt 30 includes a threaded shaft 34 extending longitudinally between a head 36 and a tapered distal end 38. A shoulder 40, having a larger diameter than the diameter of the shaft 34, extends between the shaft 34 and the head 36. A retaining washer 42 is fitted about the threaded shaft 34 and seated against the mounting structure 28. A spacer 44 is positioned and sandwiched between the belt anchor 24 and retaining washer 42 to space the shoulder 40 from the washer 42 and mounting structure 28.

Figure 3:
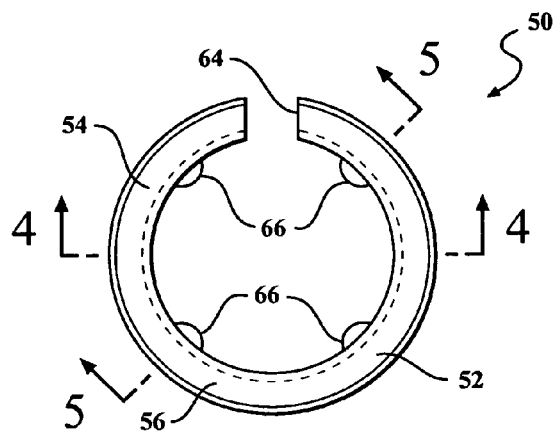
FIG. 3 is top view of the pivot bushing of FIG. 2.
Figure 4:
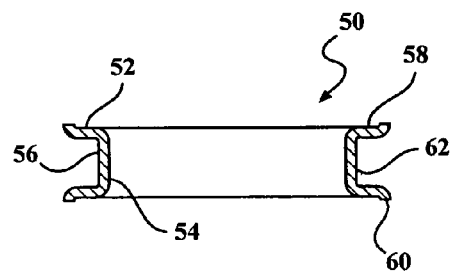
FIG. 4 is a cross-sectional view taken along line 4-4 of FIG. 3.
Figure 5:
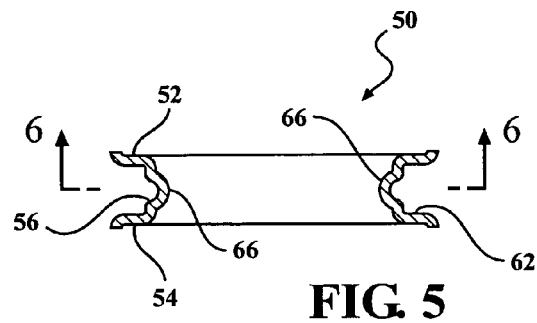
FIG. 5 is a cross-sectional view taken along line 5-5 of FIG. 3.
Figure 6:
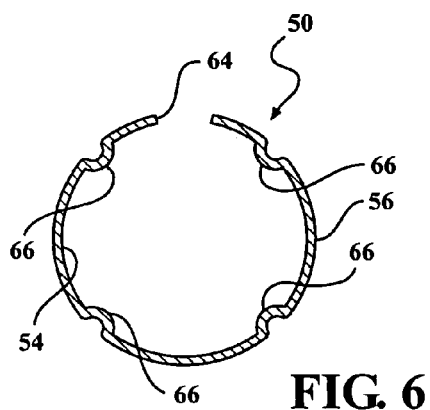
FIG. 6 is a cross-sectional view taken along line 6-6 of FIG. 5.

Finally, the subject invention relates to a pivot bushing 50 seated between the shoulder 40 and belt anchor 24 to insulate, reduce vibration, and reduce friction therebetween. More specifically, referring to FIGS. 2-6, the pivot bushing 50 is a ring-shaped member defined by a circumferential planar rim 52 having an inner surface 54 defining a bushing aperture and an outer surface 56 defining a bearing surface. An upper flange 58 projects outwardly from the upper edge of the rim 52 and extends about the perimeter of the outer surface 56. Similarly, a lower flange 60 projects outwardly from the lower edge of the rim 52 and extends about the perimeter of the outer surface 56. The upper and lower flanges 58, 60 and outer surface 56 define a channel 62 for receiving the edge 33 of the belt anchor 24 formed by the aperture 32 therein, as shown in FIG. 2. The rim 52 of the bushing 50 may be split by a opening or gap 64, shown in FIG. 3, to allow the bushing 50 to flex and be seated around the shoulder 40 of the pivot shaft 30 or flexed circumferentially about the pivot shaft 30 or inwardly to be seated within the aperture 32 in the anchor 24. Further, the bushing 50 includes a plurality of spaced apart protuberances 66 projecting from the inner surface 54 of the rim 52 toward the center of the bushing aperture. Each of the protuberances 66 engage with the outer surface of the shoulder 40 of the pivot shaft 30 and act as a bearing surface to reduce friction during the rotation of the belt anchor 32 about the shoulder bolt 30.

In operation, the pivot bushing 50 is seated within the aperture 32 in the belt anchor 24 such that the edge 33 of the aperture 32 is captured within the channel 62 formed by the outer surface 56, upper flange 58 and lower flange 60. The shoulder bolt, or pivot shaft, 30 is then inserted through the center of the pivot bushing 50 and aperture 32 of the anchor 24 and through the spacer 44 and retaining washer 42. The bolt 30 is then threaded to the mounting structure 28 to secure the anchor 24 to the seat assembly 10. As shown in FIG. 2, the pivot bushing 50 is seated between the head 36 of the shoulder bolt 30 and the spacer 44. The pivot bushing 50 provides a bearing surface for the anchor 24 to rotate about the shoulder bolt 30 for adjustment. Additionally, the protuberances 66 engage the outer surface of the shoulder 40 to act as a bearing and reduce friction therebetween. The upper and lower flanges 58, 60 are sandwiched on each side of the edge 33 of the anchor 24 between the head 36 and the spacer 44 to take up any stack tolerances and dampen or insulate vibrations between the anchor 24 and the shoulder bolt 30. The pivot bushing 50 is preferably molded plastic material, such as nylon, to provide low friction bearing surfaces between the shoulder bolt 30 and anchor 24.

It should be appreciated that the pivot bushing 50 may be utilized between any pivot shaft and component mounted to the seat assembly 10 for insulating and reducing friction between the pivot shaft and pivotal component.

The invention has been described here in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A pivot bushing for insulating a pivot shaft and component pivotally mounted to a seat assembly of an automotive vehicle, said pivot bushing comprising:

a circumferential planar rim having an inner surface defining a bushing aperture and an outer surface defining a bearing surface, said inner and outer surfaces extending between an upper edge and a lower edge;

an upper flange projecting outwardly from said upper edge of said rim and about the perimeter of said outer surface;

a lower flange projecting outwardly from said lower edge of said rim and about the perimeter of said outer surface defining a channel formed between said outer surface, upper flange and lower flange for receiving and insulating the component from the pivot shaft; and a plurality of spaced apart bulbous protuberances projecting radially from said inner surface of said rim for providing a plurality of bearing surfaces when engaged with the pivot shaft to reduce friction therebetween upon pivotal movement of the component relative to the pivot shaft.

2. A pivot bushing as set forth in claim 1 further including an opening formed in said rim to allow said bushing to flex circumferentially about the pivot shaft.

* * * * *